United States Patent
Kobayashi et al.

(10) Patent No.: US 7,997,613 B2
(45) Date of Patent: Aug. 16, 2011

(54) MOTORCYCLE PASSENGER PROTECTING SYSTEM

(75) Inventors: Yuki Kobayashi, Wako (JP); Norihiko Kurata, Wako (JP); Emi Shida, Wako (JP); Yoshiharu Wada, Wako (JP); Makoto Ishiwatari, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 106 days.

(21) Appl. No.: 12/057,021

(22) Filed: Mar. 27, 2008

(65) Prior Publication Data
US 2008/0238056 A1    Oct. 2, 2008

(30) Foreign Application Priority Data

Mar. 30, 2007    (JP) .................................. 2007-094145

(51) Int. Cl.
*B60R 21/16*    (2006.01)
*B60K 28/14*    (2006.01)
(52) U.S. Cl. ........................................ 280/735; 180/281
(58) Field of Classification Search .................. 280/735, 280/730.1, 290, 733, 734; 180/271, 281, 180/286; 2/102
See application file for complete search history.

(56) References Cited

U.S. PATENT DOCUMENTS

| | | | | |
|---|---|---|---|---|
| 6,908,103 B2 * | 6/2005 | Umeda et al. | ............... | 280/730.1 |
| 7,445,235 B2 * | 11/2008 | Makabe et al. | ............... | 280/735 |
| 7,630,806 B2 * | 12/2009 | Breed | ............................ | 701/45 |
| 7,656,283 B2 * | 2/2010 | Kushida et al. | ............... | 340/468 |
| 7,658,256 B2 * | 2/2010 | Kobayashi | ................ | 180/274 |
| 2007/0075533 A1 * | 4/2007 | Makabe et al. | ............... | 280/735 |
| 2008/0105482 A1 * | 5/2008 | Yamaguchi et al. | ........... | 180/271 |
| 2008/0238056 A1 * | 10/2008 | Kobayashi et al. | ........... | 280/735 |
| 2009/0127835 A1 * | 5/2009 | Lin | ............................ | 280/730.1 |

FOREIGN PATENT DOCUMENTS

| | | |
|---|---|---|
| DE | 10104019 C1 | 1/2002 |
| DE | 10146562 A1 | 4/2003 |
| JP | 2005-153613 A | 6/2005 |
| JP | 2006-218971 A | 8/2006 |

* cited by examiner

*Primary Examiner* — Eric Culbreth
*Assistant Examiner* — Karen A Beck
(74) *Attorney, Agent, or Firm* — Westerman, Hattori, Daniels & Adrian, LLP

(57) ABSTRACT

Multiple protecting devices, such as an air bag and an air bag jacket, are controlled and operated in accordance with the shape and size of an impact. A normal collision determining section causes the air bag and/or the air bag jacket to operate in accordance with the magnitude and direction of a collision based on outputs of G sensors. When a collision predicting section predicts a collision on the basis of other vehicle information obtained by a vehicle-to-vehicle communication device and own-vehicle information, it causes a stand-by collision determining section to start instead of the normal collision determining section. The stand-by collision determining section determines a collision mode in advance and sets a threshold value for determining the outputs of the G sensors to a value different from a value used in the determination of the normal collision determining section so as to permit quick determination of a collision.

8 Claims, 4 Drawing Sheets

MOTORCYCLE PASSENGER PROTECTING SYSTEM

FIELD OF INVENTION

The present invention relates to a motorcycle passenger protecting system and more particularly to a motorcycle passenger protecting system capable of determining operation of an air bag and that of an air bag jacket in accordance with the situation of an impact applied to a body of the motorcycle.

BACKGROUND OF THE INVENTION

Recently there has been developed a motorcycle equipped with an air bag device adapted to expand and spread upon detection of an impact to cushion the impact against a passenger. For example, JP-A No. 2005-153613 discloses a motorcycle equipped with an upper air bag device for the upper half of the body of a rider and a lower air bag device for the lower half of the rider's body. Further, JP-A No. 2006-218971 discloses an air bag jacket for wear of a passenger.

SUMMARY OF THE INVENTION

In an air bag device for a motorcycle, whether an air bag is to be operated or not is usually determined on the basis of detection of an impact by a G sensor. It is also under study to determine whether an air bag jacket is to be operated or not on the basis of whether a passenger on a vehicle body has moved a predetermined distance or not during travel.

Determination of operation of the air bag and the air bag jacket is controlled synthetically and the air bag and the air bag jacket can be properly used selectively in accordance with the situation of an impact applied to the vehicle body.

It is an object of the present invention to provide a motorcycle passenger protecting device including an air bag and an air bag jacket wherein the air bag and the air bag jacket are controlled synthetically, thereby permitting the two to be operated properly in accordance with the situation of an impact applied to a vehicle body.

According to one aspect of the present invention, a motorcycle passenger protecting system is provided for cushioning an external impact against a passenger. The system comprises an air bag disposed so as to expand and spread between a passenger seat and a steering handle, an air bag jacket for wear of the passenger, a plurality of impact sensors adapted to provide outputs in response to an impact given to the motorcycle concerned from the exterior, collision predicting means, and collision determination means for determining a collision on the basis of whether a deceleration and an impact degree both obtained on the basis of the outputs of the impact sensors are not smaller than respective threshold values. The collision determination means causes at least one of the air bag and the air bag jacket to operate in accordance with the output of each of the plural impact sensors upon determination of the collision, and either a collision stand-by determination mode or a normal collision determination mode is selected on the basis of whether the collision was predicted or not by the collision predicting means, then the threshold values of the deceleration and the impact degree are switched over in accordance with the selected determination mode.

Accordingly, when the impact sensors produce outputs not smaller than the threshold values of predetermined deceleration and impact degree upon imposition of an impact on the motorcycle, the air bag and the air bag jacket are operated. Moreover, at least one of the air bag and the air bag jacket is operated in accordance with an impact mode determined on the basis of the output of each of the plural impact sensors. Further, when a collision is predicted within the predetermined time, switching is made from the normal collision determination mode to the collision stand-by determination mode and the determination threshold values for the impact sensors are switched over. In the case where the collision can thereby be predicted, the protecting system can be operated properly in accordance with the mode of the predicted collision.

According to another aspect of the present invention, the collision stand-by determination mode includes a plurality of determination modes including at least a front collision stand-by determination mode out of the front collision stand-by determination mode, an oblique collision stand-by determination mode, a side collision stand-by determination mode and a rear-end collision stand-by determination mode in accordance with the outputs of the plural impact sensors.

Accordingly, the direction of the impact applied to the motorcycle is divided into plural directions and the protecting system can be operated properly in accordance with each of the directions.

According to another aspect of the present invention, the collision predicting means is constructed so as to specify another vehicle which is presumed to reach a position of contact with the motorcycle within an estimated time on the basis of information provided from a plurality of other vehicles through a vehicle-to-vehicle communication device and information on the motorcycle.

Accordingly, as to another vehicle existing at a dead angle relative to the motorcycle, the influence thereon on the motorcycle is predicted on the basis of the information obtained by the vehicle-to-vehicle communication device and hence the protecting system can be operated properly.

According to another aspect of the present invention, the information provided from the plural other vehicles is the positions, speeds and routes of the other vehicles and the information on the motorcycle is the speed of the motorcycle.

Accordingly, as to another vehicle existing at a dead angle relative to the motorcycle, the influence thereon on the motorcycle is predicted on the basis of the information obtained by the vehicle-to-vehicle communication device and hence the protecting system can be operated properly.

According to another aspect of the present invention, the information provided from the other vehicles further includes the weights of the other vehicles and each of the determination modes included in the collision stand-by determination mode further includes a high-speed collision mode and a low-speed collision mode which are distinguished from each other in accordance with relative speeds between the motorcycle and the other vehicles and the weights of the other vehicles.

Accordingly, the magnitude of an impact imposed on the motorcycle can be predicted and determined on the basis of the vehicle weights and relative speeds and hence the protecting system can be operated properly in accordance with the magnitude of the impact.

According to another aspect of the present invention, the collision predicting means is constructed so as to predict a collision on the basis of information detected by not only the vehicle-to-vehicle communication device but also a road-to-vehicle communication device.

Accordingly, since information obtained from the road-to-vehicle communication device is also added, a collision can be predicted with higher accuracy and the protecting system can be operated properly.

BRIEF DESCRIPTION OF THE DRAWINGS

A preferred embodiment of the present invention will be described with reference to the accompanying drawings, wherein.

DETAILED DESCRIPTION OF THE INVENTION

An embodiment of the present invention will now be described with reference to the drawings.

Figure 2:
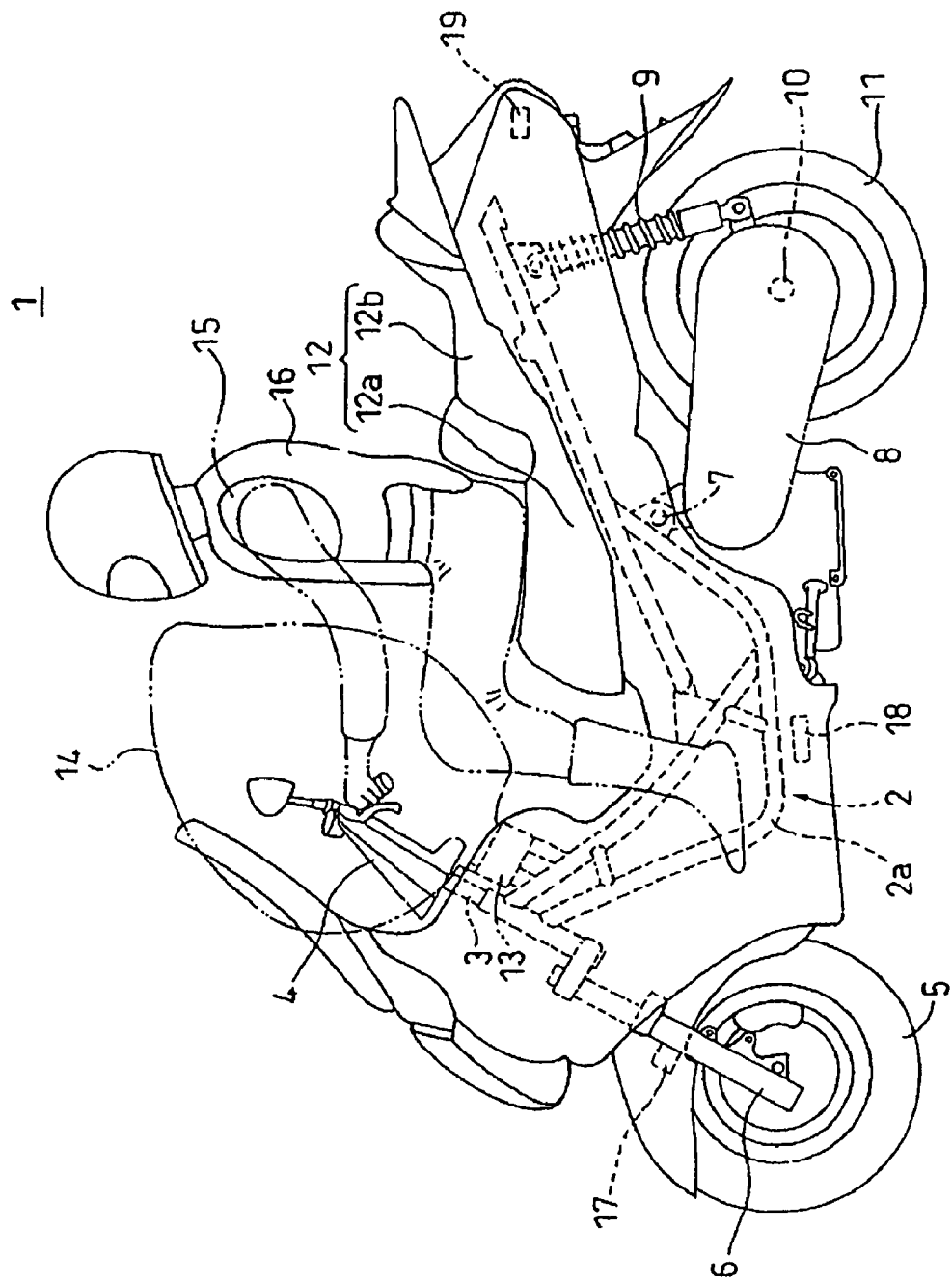
FIG. 2 is a side view of a motorcycle equipped with the motorcycle passenger protecting system of the embodiment.

FIG. 2 is a left side view of a motorcycle equipped with a passenger protecting system according to an embodiment of the present invention and an air bag device (air bag module) used therein, with a passenger riding on the motorcycle, the passenger wearing an air bag jacket. The motorcycle, indicated at 1, has a frame body 2. In front of the frame body 2 is provided a steering stem 3 which is supported rotatably in steering directions. A handlebar 4 is mounted on top of the steering stem 3 and a front fork 6 which supports a front wheel 5 is connected to a lower portion of the steering stem 3. Nearly centrally of the frame body 2, a swing unit 8 is supported vertically swingably by a pivot shaft 7. The swing unit 8 has an engine, a transmission and a reduction mechanism. A rear end of the swing unit 8 is connected to a rear portion of the frame body 2 through a rear cushion 9. A rear wheel 11 which is a drive wheel is coupled to an output shaft of the swing unit 8. A passenger seat 12 is disposed at an upper portion in an area from the central portion to the rear portion of the frame body 2. The passenger seat 12 is made up of a rider seat 12a and a pillion 12b positioned behind the rider seat.

In a front portion of the frame body 2 is mounted an air bag module 13. The air bag module is equipped with an inflator and an air bag. The inflator is ignited under preset conditions and the air bag expands and spreads with the resulting gas. In FIG. 2, there is shown an air bag 14 which is in a spread state. The air bag 14 is set so as to expand in front of a passenger 15 sitting on the rider seat 12a. The passenger 15 wears an air bag jacket 16 provided with an expansible air chamber. As the air bag jacket 16 there may be used a known one having an air bag of a shape conforming to the upper half of the passenger 15 and an inflator for introducing gas into the air bag.

An acceleration sensor 17 as impact detecting means for detecting an impact which causes the air bag 14 and the air bag jacket 16 to operate is attached to the front fork 6. Acceleration sensors 18 and 19 are also provided at side faces (both side faces) and rear portion, respectively, of the vehicle body. The acceleration sensors 18 are attached to both right and left sides of the central lower portion of the frame body 2, e.g., lower tubes 2a which constitute the frame body 2, while the acceleration sensor 19 is accommodated, for example, within a tail light unit mounted at the rear portion of the vehicle body.

Outputs of the acceleration sensors 17 to 19 are inputted to an electronic control unit (ECU) (not shown) for air bag and are used for determining operation of the air bag module 13 and that of the air bag jacket 16. In each of the air bag module 13 and the air bag jacket 16 there is provided harness (not shown) so as to permit input of an ignition signal provided from the aforesaid ECU.

Figure 1:
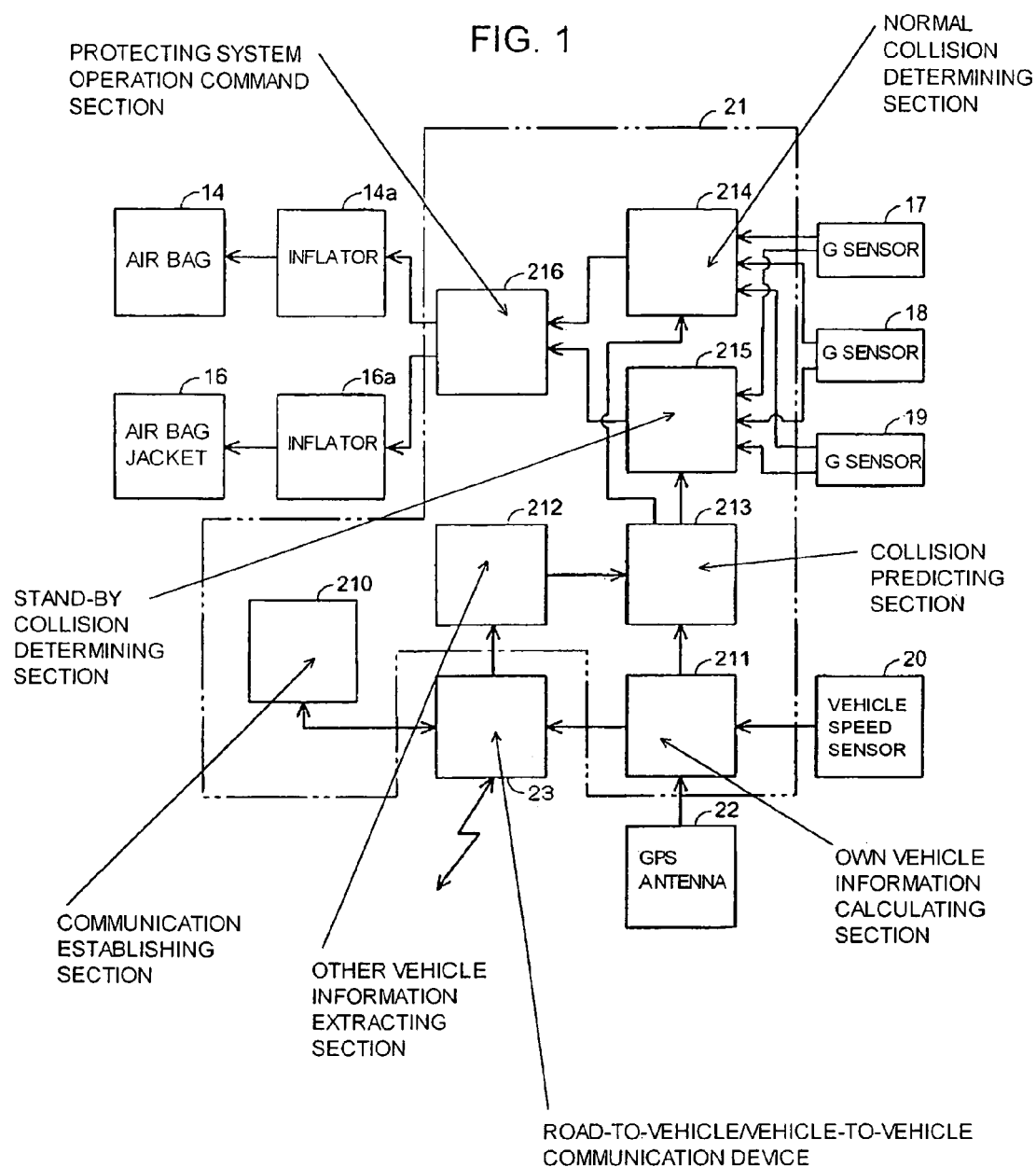
FIG. 1 is a block diagram showing a system configuration of a motorcycle passenger protecting system according to an embodiment of the present invention.

FIG. 1 is a system block diagram of the passenger protecting system of this embodiment. The passenger protecting system includes the air bag 14, the air bag jacket 16, the acceleration sensors (G sensors) 17, 18, 19, a vehicle speed sensor 20, ECU 21, GPS antenna 22 and a vehicle-to-vehicle communication device 23. When another vehicle equipped with a similar vehicle-to-vehicle communication device approaches a predetermined distance, the vehicle-to-vehicle communication device 23 establishes a communication network between it and another vehicle to transmit and receive predetermined information. The vehicle-to-vehicle communication device 23 is made up of a vehicle-to-vehicle communication antenna and a vehicle-to-vehicle communication modem (2.4 gigahertz radio communication machine).

The ECU 21 includes a communication establishing section 210, an own-vehicle information calculating section 211, an other-vehicle information extracting section 212, a collision predicting section 213, a normal collision determining section 214, a stand-by collision determining section 215, and a protecting system operation command section 216. Functions of these sections are each implemented by a microcomputer (CPU) and memory.

The communication establishing section 210 specifies other vehicles present within a predetermined distance on the basis of a radio wave received in the vehicle-to-vehicle communication device 23 and starts two-way communications between it and the other vehicles. The own-vehicle information calculating section 211 calculates the position, azimuth and route of the own vehicle, i.e., the motorcycle related to this embodiment, which is running on the basis of a GPS signal received in the GPS antenna 22 and at the same time calculates the vehicle speed from a detection signal provided from the vehicle speed sensor 20, then outputs the results as the own-vehicle information from the vehicle-to-vehicle communication device 23. The other-vehicle information extracting section 212 extracts other-vehicle information transmitted from other vehicles on the information received in the vehicle-to-vehicle communication device 23.

The own-vehicle information and the other-vehicle information each comprise an attribute ID and an information part. In the attribute ID there are further included a weight ID and a vehicle model ID. The vehicle weight is represented in terms of the weight ID for example in a divided manner at every 250 kg over 1000 kg. For example, the vehicle weight smaller than 1000 kg is weight ID "0," the vehicle weight not smaller than 1000 kg and smaller than 1250 kg is weight ID "1," and the vehicle weight not smaller than 1250 kg and smaller than 1500 kg is weight ID "2." As to the vehicle model ID, for example, a sedan shape is vehicle model ID "0," a compact shape is vehicle model ID "1," and a small-sized mini-van shape is vehicle model ID "2".

On the basis of own-vehicle information and other-vehicle information the collision predicting section 213 determines whether there is a possibility or not of a collision in the near future (e.g., after one second) between the own vehicle and another vehicle. This collision possibility is determined for all of the vehicles which have established two-way communications. Then, the collision predicting section ranks vehicles high in collision possibility, namely, in order from shorter collision possibility time, selects a predetermined number of high-ranking other vehicles and extracts them as collision candidates. For the collision candidates the stand-by collision determining section 215 determines a detailed collision mode. More specifically, the stand-by collision determining section 215 determines collision angles, relative speeds between the own vehicle and other vehicles, and impact degrees based on the weights of other vehicles.

In accordance with the mode determined by collision angles and impact degrees based on own-vehicle information and other-vehicle information, the protecting system operation command section 216 selects whether both or one of the air bag 14 and the air bag jacket 16 are (is) to be operated and determines an operation timing. The operation timing is determined in accordance with a threshold value which determines whether a collision will occur or not on the basis of outputs provided from the acceleration sensors 17-19 as impact sensors. When the deceleration and impact degree based on the outputs provided from the acceleration sensors 17-19 exceed the respective threshold values, an ignition command is inputted from the protective system operation command section 216 to each of an inflator 14a for the air bag 14 and an inflator 16a for the air bag jacket 16.

The normal collision determining section 214 determines a collision with a vehicle not equipped with the vehicle-to-vehicle communication device or with an obstacle. Since the approach to a vehicle not equipped with the vehicle-to-vehicle communication device or with an obstacle cannot be predicted in advance, a collision with another vehicle or an obstacle is determined on a different basis from the collision mode determined in the stand-by collision determining section 215 and the protecting system operation command section 216 is operated.

In connection with the collision mode determination there are a normal collision determination mode and a collision stand-by determination mode. In the normal collision determination mode are included front collision determination, side collision determination, oblique collision determination and rear-end collision determination. In the collision stand-by determination mode are included a high-speed front collision stand-by determination mode, a low-speed front collision stand-by determination mode, a high-speed oblique collision stand-by determination mode, a low-speed oblique collision stand-by determination mode, a high-speed rear-end collision stand-by determination mode, and a low-speed rear-end collision stand-by determination mode.

For each of the above determination modes there are set threshold values of deceleration and impact degree, as well as an operation timing, for operating the air bag 14 and the air bag jacket 16. "Deceleration" is an integral of the acceleration detected by the acceleration sensor and "impact degree" is a collision violence index extracted from the acceleration. That is, the value obtained by total integration or interval integration of acceleration data and calculating the degree of vehicle deceleration in a predetermined short time is the deceleration. The impact degree is a high-frequency oscillation calculated for example by frequency analysis of acceleration data or an energy quantity in an extremely short time.

The following is an example of threshold values of deceleration and impact degree.

"Normal Collision Determination Mode"

In the front collision determination in the normal collision determination mode, the air bag 14 is operated when the deceleration detected by the acceleration sensor 17 exceeds 100, and the air bag jacket 16 is operated in 0.1 second after the operation of the air bag 14. In the side collision determination in the normal collision determination mode, the air bag jacket 16 is operated when the deceleration detected by one of the right and left acceleration sensors 18 exceeds 100. In the oblique collision determination in the normal collision determination mode, the air bag 14 is operated when the deceleration detected by the acceleration sensor 17 exceeds 100, and the air bag jacket 16 is operated when the impact degree detected by the acceleration sensor 18 exceeds 50. Further, in the rear-end collision in the normal collision determination mode, the air bag jacket 16 is operated when the deceleration detected by the acceleration sensor 19 exceeds 100.

"High-Speed Front Collision Stand-by Determination Mode"

In the front collision determination and oblique collision determination in the high-speed front collision stand-by determination mode, both air bag 14 and air bag jacket 16 are operated simultaneously when the deceleration detected by the acceleration sensor 17 exceeds 50. In the side collision determination and rear-end collision determination, a collision is determined using the same threshold values as in the normal collision determination mode.

"Low-Speed Front Collision Stand-by Determination Mode"

In the front collision determination and oblique collision determination in the low-speed front collision stand-by determination mode, the air bag 14 is operated when the deceleration detected by the acceleration sensor 17 exceeds 80, and the air bag jacket 16 is operated in 0.1 second after the operation of the air bag 14. The side collision determination and the rear-end collision determination, a collision is determined using the same threshold values as in the normal collision determination mode.

"High-Speed Oblique Collision Stand-by Determination Mode"

In the front collision determination, oblique collision determination and side collision determination in the high-speed oblique collision stand-by determination mode, both air bag 14 and air bag jacket 16 are operated simultaneously when the deceleration detected by the acceleration sensor 17 exceeds 50. Likewise, both air bag 14 and air bag jacket 16 are operated simultaneously when the impact degree based on the acceleration data detected by one of the right and left acceleration sensors 18 exceeds 50. In the rear-end collision determination, a collision is determined using the same threshold values as in the normal collision determination mode.

"Low-Speed Oblique Collision Stand-by Determination Mode"

In the front collision determination, oblique collision determination and side collision determination in the low-speed oblique collision stand-by determination mode, the air bag 14 is operated when the deceleration detected by the acceleration sensor 17 exceeds 80, and the air bag jacket 16 is operated in 0.1 second after the operation of the air bag 14. Further, both air bag 14 and air bag jacket 16 are operated simultaneously when the impact degree based on the acceleration detected by one of the right and left acceleration sensors 18 exceeds 50. In the rear-end collision determination, a collision is determined using the same threshold values as in the normal collision determination mode.

"High-Speed Rear-End Collision Stand-by Determination Mode"

In the rear-end determination in the high-speed rear-end collision stand-by determination mode, the air bag jacket is operated when the deceleration detected by the acceleration sensor 19 exceeds 50. In the front collision determination, side collision determination and oblique collision determination, a collision is determined using the same threshold values as in the normal collision determination mode.

"Low-Speed Rear-End Collision Stand-by Determination Mode"

In the rear-end collision determination in the low-speed rear-end collision stand-by determination mode, the air bag jacket is operated when the deceleration detected by the acceleration sensor 19 exceeds 80. In the front collision determination, side collision determination and oblique collision determination, a collision is determined using the same threshold values as in the normal collision determination mode.

The threshold values of deceleration and impact degree used for the collision determination described above are only an example and no limitation is made thereto. What is important is to let the protecting system operate in an optimum condition and at an optimum timing in accordance with predicted collision violence and collision direction. As is seen from the above threshold value setting example, when it is predicted that the collision speed will be high and the collision degree will be violent, the threshold values of deceleration and impact degree are set low to let the air bag 14 and the air bag jacket 16 expand and spread or expand at an early stage, thereby making it possible to cope with a high-speed collision.

In the case where a multi-stage inflator is provided in the air bag 14, it is possible to select whether an inflator is to be operated in multiple stages in accordance with violence of collision or plural inflators are to be ignited simultaneously without setting a delay time. In the case of a low-speed collision or when the other vehicle in a collision is small-sized and light-weight, an inflator is ignited in multiple stages. In the case of a side collision, the air bag jacket 16 is operated ahead of the air bag 14. In the case of an oblique collision, both air bag 14 and air bag jacket 16 are operated simultaneously. Further, in the case of a front collision, the air bag 14 is operated first, and upon lapse of a predetermined time after that, the air bag jacket 16 is operated.

Figure 3:
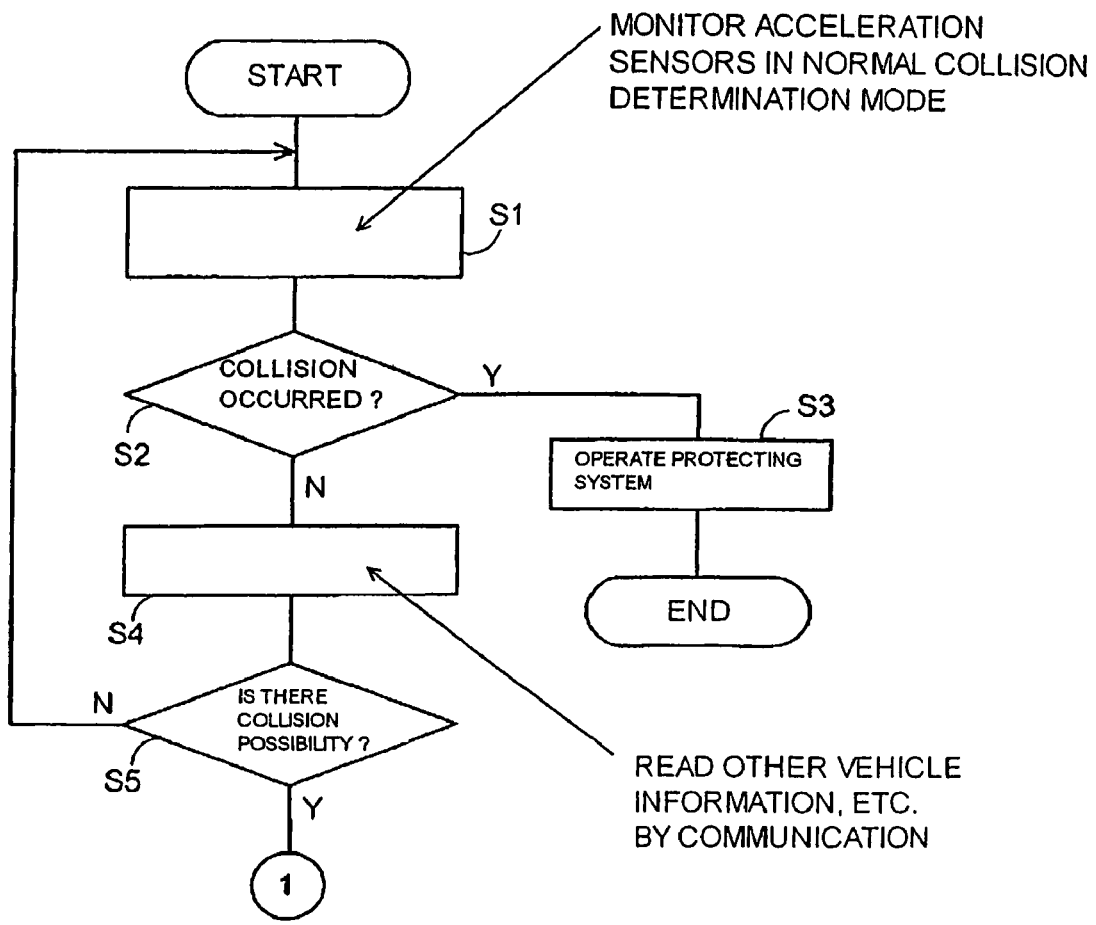
FIG. 3 is a flow chart (part 1) showing processing performed in the motorcycle passenger protecting system of the embodiment.
Figure 4:
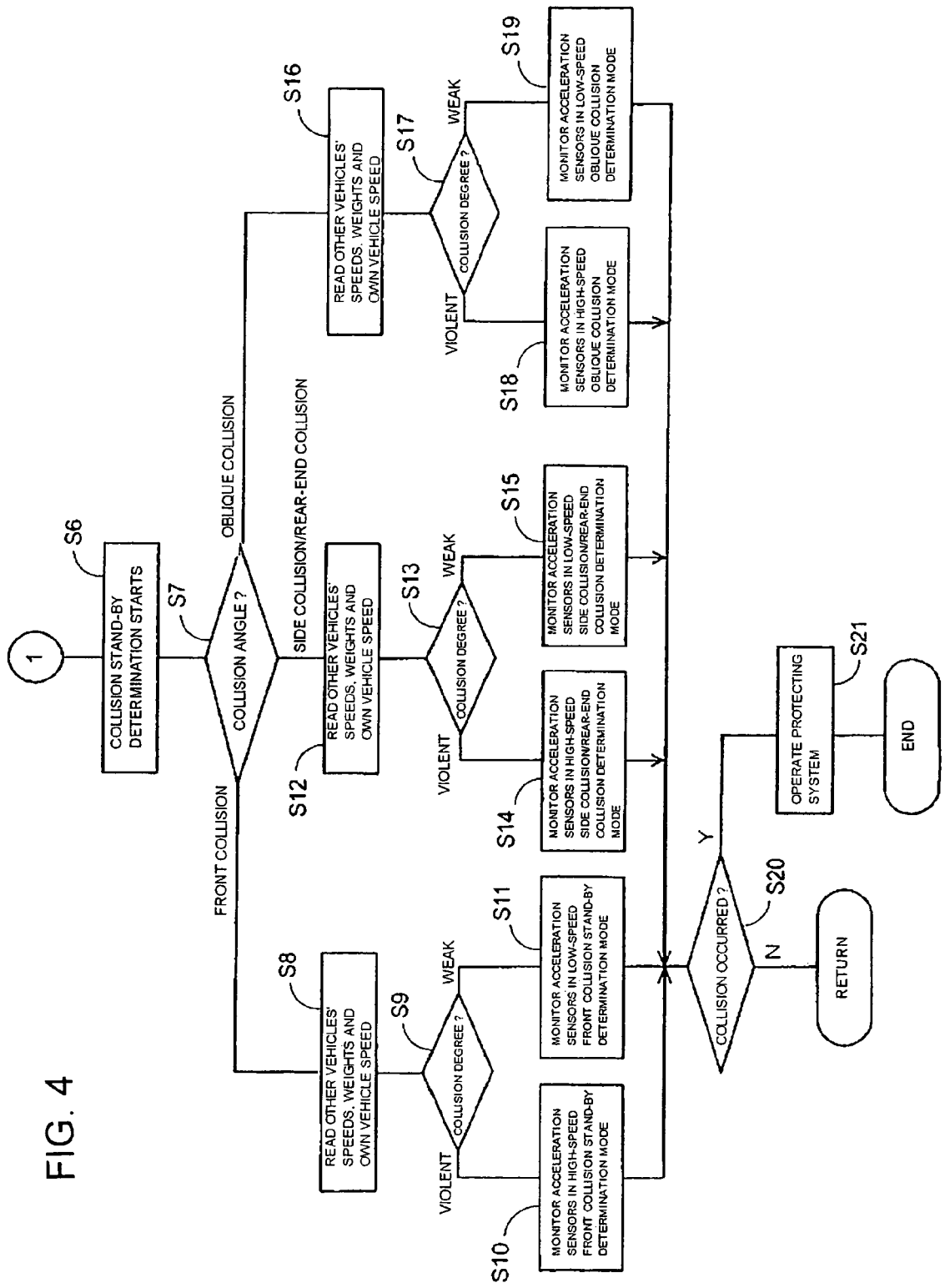
FIG. 4 is a flow chart (part 2) showing processing performed in the motorcycle passenger protecting system of the embodiment.

A switching operation for the above determination modes will now be described with reference to a flow chart. FIGS. 3 and 4 are determination mode switching flow charts. Reference is here made first to FIG. 3. In step S1, a collision determination is made in the normal collision determination mode, that is, the acceleration sensors 17 to 19 are monitored. In step S2, it is determined whether a collision has occurred or not, on the basis of the outputs of the acceleration sensors 17 to 19 and using the threshold values in the normal collision determination mode. If the answer in step S2 is affirmative, the processing flow advances to step S3, in which the protecting system, i.e., the air bag 14 and/or the air bag jacket 16, is operated in accordance with the type of the collision.

If the answer in step S2 is negative, that is, if the occurrence of a collision was not determined, the processing flow advances to step S4, in which traveling directions and speeds of other vehicles as other vehicle information, as well as the speed of the own vehicle and the distances between the own vehicle and other vehicles, are read. In step S5, on the basis of the other vehicle information and the own vehicle information read in step S4, it is determined whether there is a possibility of collision after a predetermined time, e.g., after one second. If the answer in step S5 is affirmative, switching is made from the normal collision determination mode to the collision stand-by determination mode and the processing flow advances to step S6. If it is not determined that there is a possibility of collision, the processing flow returns from step S5 to step S1.

In FIG. 4, a shift is made to the collision stand-by determination mode and in step S6 the collision stand-by determination is started. In step S7, any of front collision, side collision, rear-end collision and oblique collision is determined on the basis of a predicted collision angle.

If a front collision is determined, the front collision stand-by determination mode is selected and a shift is made to step S8. In step S8, the speeds and weights of other vehicles, as well as the speed of the own vehicle, are read. In step S9, a collision energy is estimated from the information read in step S8 and, on the basis of whether the collision energy is not smaller than a predetermined value or not, it is determined whether the collision is a violent collision or a weak collision. If the collision is a violet collision, the processing flow advances to step S10, in which the outputs of the acceleration sensors 17 to 19 are monitored in the high-speed front collision stand-by determination mode. If the collision is a weak collision, the processing flow advances to step S11, in which the outputs of the acceleration sensors 17 to 19 are monitored in the low-speed front collision stand-by determination mode.

If a collision or a rear-end collision is determined in step S7, the side collision or rear-end collision stand-by determination mode is selected and a shift is made to step S12. In step S12, the speeds and weights of other vehicles, as well as the speed of the own vehicle, are read. In step S13, a collision energy is estimated from the information read in step S12 and, on the basis of whether the collision energy is not smaller than a predetermined value or not, it is determined whether the collision is a violent collision or a weak collision. If the collision is a violent collision, the processing flow advances to step S14, in which the outputs of the acceleration sensors 17 to 19 are monitored in the high-speed side collision or rear-end collision stand-by determination mode. If the collision is a weak collision, the processing flow advances to step S15, in which the outputs of the acceleration sensors 17 to 19 are monitored in the low-speed side collision or rear-end collision stand-by determination mode.

If it is determined in step S7 that the collision is an oblique collision, the oblique collision stand-by determination mode is selected and a shift is made to step S16. In step S16, the speeds and weights of other vehicles, as well as the speed of the own vehicle, are read. In step S17, a collision energy is estimated from the information read in step S16 and, on the basis of whether the collision energy is not smaller than a predetermined value or not, it is determined whether the collision is a violent collision or a weak collision. If the collision is a violent collision, the processing flow advances to step S18, in which the outputs of the acceleration sensors 17 to 19 are monitored in the high-speed oblique collision stand-by determination mode. If the collision is a weak collision, the processing flow advances to step S19, in which the outputs of the acceleration sensors 17 to 19 are monitored in the low-speed oblique collision stand-by determination mode.

In step S20, on the basis of the outputs of the acceleration sensors 17 to 19, it is determined whether a collision has occurred or not. If the answer in step S20 is affirmative, the processing flow advances to step S21, in which the protecting system, i.e., the air bag 14 and/or the air bag jacket 16, is operated in accordance with the type of the collision. If a collision has not occurred, the processing flow returns to a main routine (not shown).

According to this embodiment, as described above, not only the air bag and the air bag jacket are controlled synthetically, but also a collision is predicted by vehicle-to-vehicle communication and there is made determination of operation on the basis of operation determination values according to the situation of the predicted collision. Although an example of acquiring information by the vehicle-to-vehicle communication means has been shown, no limitation is made thereto, but there also may be used a system which predicts a collision by acquiring obstacle information, road surface information and other vehicle information from advanced cruise-assist highway system (AHS) using road-to-vehicle communication, or by acquiring distance information between an obstacle and the own vehicle by means of a range finder using a radar, or by analyzing an image obtained using a camera.

In JP-A No. 2002-183889 is described an example of a vehicle which carries a vehicle-to-vehicle communication device thereon to make mutual communication of traveling information possible, thereby specifying another vehicle likely to affect the traveling of an own vehicle. Also in the own vehicle of this embodiment, it is possible to output information such as traveling position, speed, azimuth and route of the own vehicle by utilizing a vehicle-to-vehicle communication device similar to the vehicle-to-vehicle communication device and receive information from other vehicles.

As an example of road-to-vehicle communication, in JP-A No. H10-320691 there is disclosed an automatic traveling vehicle equipped with traveling control means which causes an own vehicle to run automatically on the basis of information obtained by road-to-vehicle communication between it and information output means disposed near a road and information obtained by vehicle-to-vehicle communication between the own vehicle and other vehicles.

The present invention is not limited to the above embodiment. For example, the collision stand-by determination mode need not include all of front collision, side collision, oblique collision and rear-end collision insofar as the determination of collision can be made in plural modes including at least a front collision. That is, one or two of the stand-by determination modes of side, oblique and rear-end collisions may be omitted.

We claim:

1. A motorcycle passenger protecting system for cushioning an external impact against a passenger, said system comprising:
    an air bag disposed so as to expand and spread between a passenger seat and a steering handle of a motorcycle;
    an air bag jacket for wear of the passenger;
    a plurality of impact sensors adapted to provide outputs in response to an impact given to the motorcycle concerned from the exterior;
    collision predicting means for predicting a collision; and
    collision determination means for determining a collision on the basis of whether or not a deceleration and an impact degree both obtained on the basis of the outputs of the impact sensors are not smaller than respective threshold values,
    wherein the collision determination means selectively operates only one of the air bag and the air bag jacket in accordance with the output of each of the plurality of impact sensors upon determination of the collision, and a collision stand-by determination mode or a normal collision determination mode is selected on the basis of whether the collision was predicted or not by the collision predicting means, then the threshold values of the deceleration and the impact degree are switched over in accordance with the selected determination mode.

2. The motorcycle passenger protecting system according to claim 1,
    wherein the collision stand-by determination mode includes a plurality of determination modes including a front collision stand-by determination mode, and a determination mode selected from the group consisting of an oblique collision stand-by determination mode, a side collision stand-by determination mode and a rear-end collision stand-by determination mode, in accordance with the outputs of the plurality of impact sensors.

3. The motorcycle passenger protecting system according to claim 1,
    wherein the collision predicting means identifies another vehicle which is predicted to reach a position of contact with the motorcycle within an estimated time on the basis of information provided from a plurality of other vehicles through a vehicle-to-vehicle communication device and information on the motorcycle.

4. The motorcycle passenger protecting system according to claim 2,
    wherein the collision predicting means identifies another vehicle which is predicted to collide with the motorcycle within an estimated time on the basis of information provided from a plurality of other vehicles through a vehicle-to-vehicle communication device and information on the motorcycle.

5. The motorcycle passenger protecting system according to claim 3, wherein
    the information provided from the plurality of other vehicles is the positions, speeds and routes of the other vehicles, and
    the information on the motorcycle is the speed of the motorcycle.

6. The motorcycle passenger protecting system according to claim 4, wherein
    the information provided from the plurality of other vehicles is the positions, speeds and routes of the other vehicles, and
    the information on the motorcycle is the speed of the motorcycle.

7. The motorcycle passenger protecting system according to claim 4, wherein
    the information provided from the other vehicles further includes the weights of the other vehicles, and
    each of the determination modes included in the collision stand-by determination mode further includes a high-speed collision mode and a low-speed collision mode which are distinguished from each other in accordance with relative speeds between the motorcycle and the other vehicles and the weights of the other vehicles.

8. The motorcycle passenger protective system according to claim 3, wherein
    the collision predicting means predicts a collision on the basis of information detected by the vehicle-to-vehicle communication device and a road-to-vehicle communication device.

* * * * *